United States Patent

Koiso et al.

[11] 4,029,643
[45] June 14, 1977

[54] CHROMIUM CONTAINING AZO DYES

[75] Inventors: Yoichi Koiso, Yono; Koji Ito, Tokyo; Hiroshi Seno, Omiya, all of Japan

[73] Assignee: Nippon Kayaku Kabushiki Kaisha, Tokyo, Japan

[22] Filed: May 19, 1972

[21] Appl. No.: 255,134

[30] Foreign Application Priority Data

May 29, 1971 Japan .............................. 46-36713

[52] U.S. Cl. ............................ 260/145 B; 260/147
[51] Int. Cl.$^2$ .................................... C09B 45/48
[58] Field of Search ....................... 260/145 B, 147

[56] References Cited

UNITED STATES PATENTS

| | | | |
|---|---|---|---|
| 2,060,563 | 11/1936 | Fischer | 260/147 |
| 2,832,760 | 4/1958 | Zickendraht et al. | 260/147 X |
| 2,832,762 | 4/1958 | Zickendraht et al. | 260/147 |
| 2,906,746 | 9/1959 | Brassel et al. | 260/147 X |
| 2,921,061 | 1/1960 | Ackermann | 260/147 |

FOREIGN PATENTS OR APPLICATIONS 823,393  11/1959  United Kingdom ............... 260/147

Primary Examiner—Charles F. Warren
Attorney, Agent, or Firm—Russell & Nields

[57] ABSTRACT

Chromium containing azo dyes of the general formula (1):

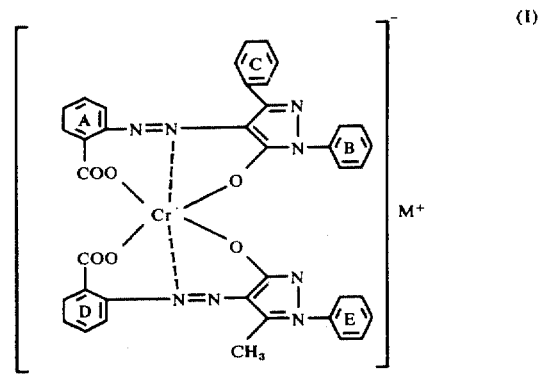

wherein one of the phenyl nuclei A, B, D and E is substituted by sulfonic acid group, the nuclei A, B, C, D and E may be substituted by one or more substituents selected from the group consisting of chlorine atom, bromine atom, nitro group, lower alkoxy group and lower alkyl group and M is an alkali metal, possess excellent fastness and give dyeings of unique bright yellow tint.

12 Claims, No Drawings

CHROMIUM CONTAINING AZO DYES

DETAILED DESCRIPTION OF THE INVENTION

A number of yellow chromium containing azo dyes have been marketed heretofore, but they have no sufficient fastness to light and moisture. It is a matter of course, therefore, that yellow dyeings of good fastness cannot be obtained by the use of such dyes. As yellow is one of the three primary colors, yellow dyes are ofted used in combination with dyes of other colors. In such case, the yellow dyes are required to have fastness almost equivalent to that of other dyes. In the event the yellow dyes are inferior in fastness, they cannot be used in combination with other dyes.

As the result of researches made on the relation between the structures and properties of dyes of this type, it has now been found that dyes of said general formula (1) possess excellent fastness and give dyeings of unique bright yellow tint.

The dyes of this invention represented by the general formula (1) can be prepared by reacting the 1:1 chromium complex of one of the monoazo dyes represented by the general formulas (2) and (3):

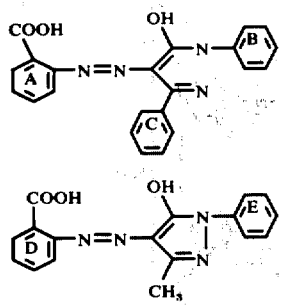

wherein the phenyl nuclei A, B, D and E have the meanings given above, preferably a dye which contains the sulfonic acid groups, with another metal free monoazo dye so as to form a 2:1 chromium complex dye.

The monoazo dyes of the general formulas (2) and (3) can be prepared by the usual known methods by coupling a diazo compound in a weakly acidic or alkaline medium with a coupling component. The diazo compound used in this process is derived from an amine such as 2-aminobenzoic acid, 2-amino-4-chlorobenzoic acid, 2-amino-4-bromobenzoic acid, 2-amino-4-sulfobenzoic acid, 2-amino-4-sulfobenzoic acid, 2-amino-5-nitrobenzoic acid, 2-amino-3 or 5-nitro-4-sulfobenzoic acid, 2-amino-3-methoxybenzoic acid, 2-amino-3 or 4-sulfo-5-chlorobenzoic acid, 2-amino-3 or 4-methylbenzoic acid or 2-amino-4-methoxy-5-bromobenzoic acid.

Mentioned as the coupling component used for the monoazo dye of the general formula (2) are 1,3-diphenyl-5-pyrazolone, 1-(2'-, 3'- or 4'-nitrophenyl)-3-phenyl-5-pyrazolone, 1-(2',3'- or 4'-chlorophenyl)-3-phenyl-5-pyrazolene, 1-(2',3'- or 4'-bromophenyl)-3-phenyl-5-pyrazolone, 1-(2'-,3'- or 4'-sulfophenyl)-3-phenyl-5-pyrazolone, 1-phenyl-3-(2',3' or 4'-chlorophenyl)-5-pyrazolone, 1-phenyl-3-(2'-, 3'- or 4'-nitrophenyl)-5-pyrazolone, 1-(2'-, 3'- or 4'-chlorophenyl)-3-(2'-, 3'- or 4'-ethylphenyl)-5-pyrazolone, 1-(2'-, 3'- or 4'-methoxyphenyl)-3-(2'-, 3'- or 4'-chlorophenyl)-5-pyrazolone, 1-(2'-sulfo-4'-methyl-5'-chlorophenyl)-3-(2'-, 3'- or 4'-methoxyphenyl)5-pyrazolone, 1-(2'-, 3'- or 4'-nitrophenyl)-3-(2'-, 3' or 4'-chlorophenyl)-5-pyrazolone, 1-(2',5'-dimethoxyphenyl)-3-(2',3'- or 4'-nitrophenyl)-5-pyrazolone, 1-(2'-chloro-4'-nitrophenyl)-3-(2'-, 3'- or 4'-chlorophenyl)-5-pyrazolone, 1-(4'-methylphenyl)-3-phenyl-5-pyrazolone, 1-(2'-chloro-4'-sulfophenyl)-3-phenyl-5-pyrazolone, 1-(2'-methyl-6'-chlorophenyl)-3-phenyl-5-pyrazolone, 1-(4'-methoxyphenyl)-3-(2',4'-dichlorophenyl)-5-pyrazolone, 1-phenyl-3-(2',4'-dichloro-5'-methylphenyl)-5-pyrazolone, 1-phenyl-3-(2'-nitro-3'-methoxyphenyl)-5-pyrazolone, 1-(4'-sulfophenyl)-3-(3'-methoxyphenyl)-5-pyrazolone, 1-phenyl-3-(3'-methylphenyl)-5-pyrazolone, etc.

Mentioned as the coupling component used for the monoazo dyes of the general formula (3) are 1-phenyl-3-methyl-5-pyrazolone, 1-(4'-nitrophenyl)-3-methyl-5-pyrazolone, 1-(2'-nitro-5'-chlorophenyl)-3-methyl-5-pyrazolone, 1-(2'-methoxy-5'-methylphenyl)-3-methyl-5-pyrazolone, 1-(2'-methyl-5'-chlorophenyl)-3-methyl-5-pyrazolone, 1-(2'-methyl-6'-chlorophenyl)-3-methyl-5-pyrazolone, 1-(2',5'-dimethoxyphenyl)-3-methyl-5-pyrazolone, 1-2',5'-dichlorophenyl)3-methyl-5-pyrazolone, 1-(2',4',6'-trichlorophenyl)-3-methyl-5-pyrazolone, 1-(4'-sulfophenyl)-3-methyl-5-pyrazolone, 1-(2'-chloro-4'-sulfophenyl)-3-methyl-5-pyrazolone, 1-(2'-ethylphenyl)-3-methyl-5-pyrazolone, 1-(2',3'- or 4'-chlorophenyl)-3-methyl-5-pyrazolone, 1-(2'-, 3'- or 4'-bromophenyl)-3-methyl-5-pyrazolone, 1-(2'-sulfo-4'-methyl-5'-chlorophenyl)-3-methyl-5-pyrazolone, 1-(2'-sulfo-4'-nitrophenyl)-3-methyl-5-pyrazolone, 1-(2',5'-dichloro-4'-sulfophenyl)-3-methyl-5-pyrazolone, 1-phenyl-3-methyl-5-pyrazolone, etc.

Conversion of a dye represented by the general formula (2) or (3) into its 1:1 chromium complex can be effected according to a usually known method, for example, by reacting the dye in an acidic medium with an excess of a trivalent chromium salt such as chromium (III) formate, chromium (III) acetate, chromium (III) sulfate or chromium (III) fluoride at the boiling point of the medium or, if desired or necessary, at a temperature above 100° C. It is generally of advantage to carry out this metallization in a well known manner, for example, in an aqueous medium, if necessary, in the presence of an organic solvent, such as alcohol or formamide.

In general it is of advantage to treat the starting materials in the present process after their manufacture and separation in the form of moist pastes, that is to say without drying them.

The reaction of the 1:1 chromium complexes dye with a metal-free dye is advantageously carried out in a weakly acidic or weakly alkaline aqueous solvent in an open or closed vessel at room temperature or an elevated temperature, for example, at 50°–120° C. Addition of an organic solvent such as alcohol or formamide or of a surfactant may assist to promote the above reaction.

In general, the proportion of the 1:1 chromium complex to the metal-free dry is advantageously as near the stoichiometrical ratio as possible. The molar ratio of the 1:1 complex to the metal-free dye is conveniently at least 0:85:1 and at most 1:0:85. An excess of the 1:1 chromium complex is generally less disadvantageous than an excess of the metal-free dye. As the molar ratio becomes nearer 1:1, the result will become more advantageous.

The novel chromium containing azo dyes obtained according to the process of this invention are suitable for dyeing and printing a very wide variety of materials, above all for dyeing animal materials, for example, silk, leather and especially wool, but also for dyeing and printing synthetic fibers of polyamide, polyurethane and polyacrylonitrile as well as fibrous mixture such as wool/polyamide mixture.

Said complexes are suitable for dyeing chiefly from a neutral or weakly acidic bath, for example, acetic acid bath. The dyeings thus obtained are level and have good fastness to light, rubbing and wetting. A variety of conventional dyeing methods including dip dyeing, printing and padding are applicable to dyeing of fibrous materials with the dyes of this invention.

Dip dyeing of nitrogen-containing fibers is generally carried out at a temperature of 90°–100° C. in a dye bath containing Glauber's salt, sodium chloride or an ammonium salt such as ammonium acetate or ammonium sulfate and an inorganic or organic acid such as acetic acid or formic acid.

Pad steam dyeing is carried out by preparing a padding liquid comprising a dye, a migration-inhibiting agent such as urea and sodium alginate, a dye solubilizing agent and a dye permeating agent, padding textile materials in the padding liquid and then dry-heating or steaming the textile material at a relatively high temperature for example, at a temperature of 100°–200° C. If necessary, the said dyeing may be effected by treating textile materials for a period from 10 seconds to 5 minutes at 70°–100° C. in an acid shock bath containing an inorganic or organic acid such as phosphoric acid or formic acid. In this case, the textile materials may be boiled after padding treatment, instead of being subjected to dry-heating or steaming, in an aqueous bath containing some acidic substances.

Printing is carried out by mixing a dye with a paste and then with an acid-generating agent such as ammonium sulfate or ammonium tartrate or with an organic acid such as acetic acid to form a colored paste, printing it on textile materials and then subjecting the materials to dry-heating or steaming.

This invention will be explained more in detail by way of examples wherein all parts are shown by weight unless otherwise indicated.

EXAMPLE I 4.9 Parts of a monoazo dye in the form of a chromium complex containing one atom of chromium per molecule of the monoazo dye which had been prepared from diazotized 2-amino-5-sulfobenzoic acid and 1-(3'-chlorophenyl)-3-methyl-5-pyrazolone and 3.7 parts of a metal-free monoazo dye which had been prepared from diazotized 2-aminobenzoic acid and 1,3-diphenyl-5-pyrazolone were stirred in 360 cc of water at 20°–40° C. The resulting suspension was made neutral by adding thereto under agitation diluted hydrochloric acid or glacial acetic acid or, if necessary, sodium carbonate and then heated to 85°–95° C. In the course of this treatment, a yellow clear solution was formed. The reaction was continued in neutral state until the two kinds of dyes used as starting materials disappear. To the reaction solution was then added sodium chloride and the resulting mixed complex was isolated by filtration and dried. This dye was a yellowish brown powdery substance represented by the formula (4) and dyed wool in yellow tint having good fastness from a bath containing ammonium acetate.

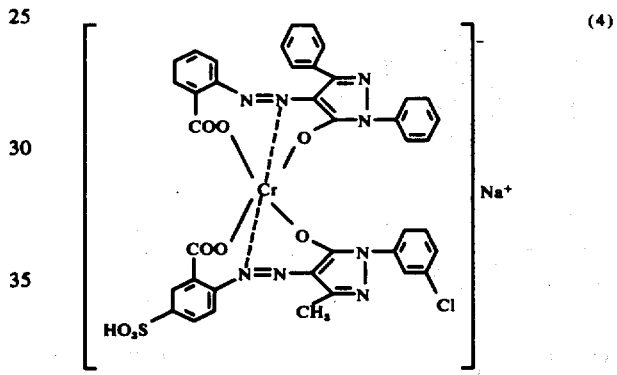

EXAMPLES 2–26

In a similar manner, a 1:1 chromium complex of a monoazo dye listed in Column (I) in the following table was reacted with a metal-free monoazo dye listed in Column (II) to yield a valuable mixed complex having the structure shown in Column (III), which also dyed wool in yellow tint having good fastness.

| EXAMPLE NO. | (I) | (II) | (III) |
|---|---|---|---|
| (2) | 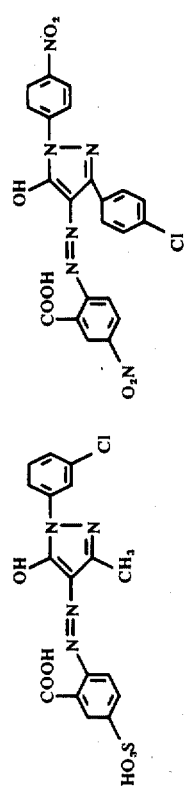 | 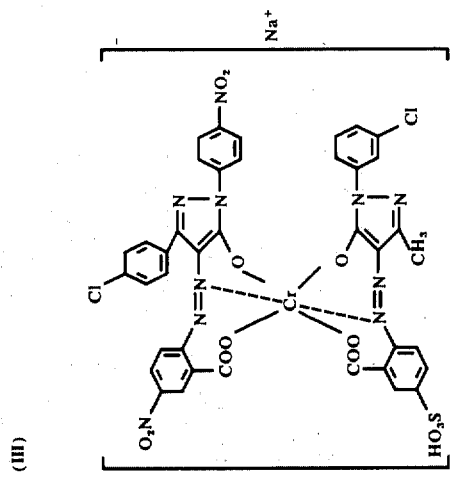 | 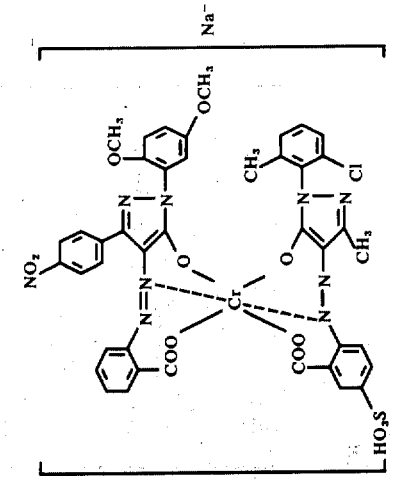 |
| (3) | 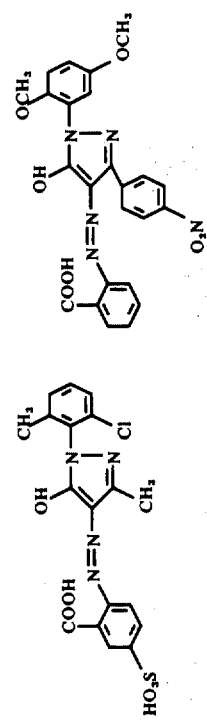 | | |

-continued
| EXAMPLE NO. | (I) | (II) | (III) |
|---|---|---|---|
| (4) | 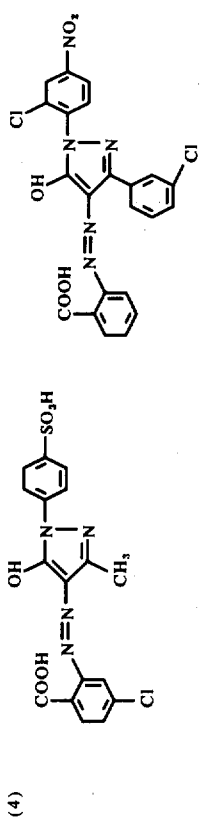 | 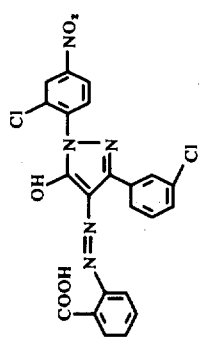 | 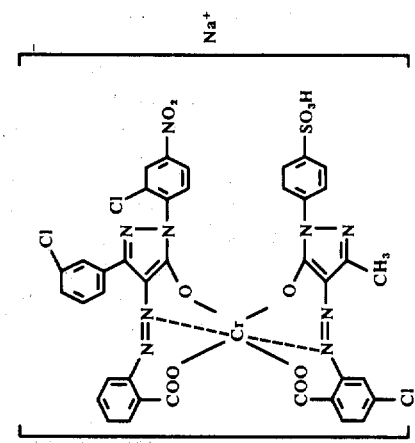 |
| (5) | 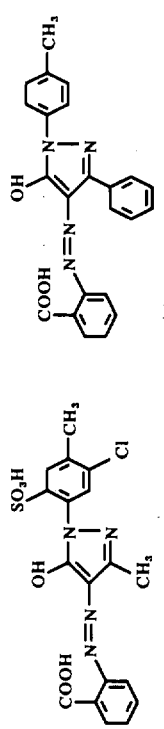 | | 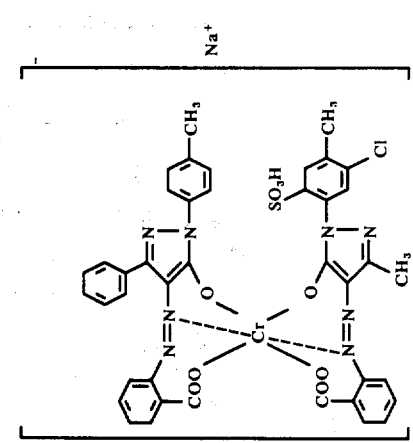 |

-continued
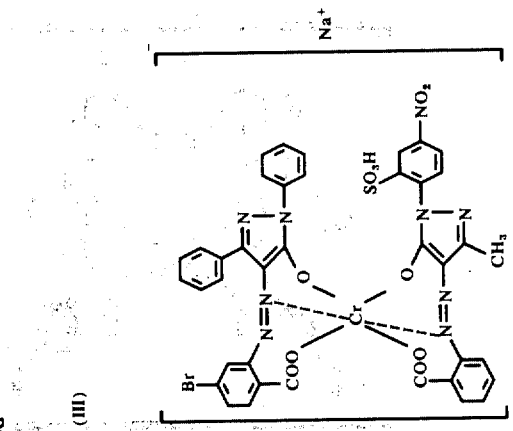
(III)
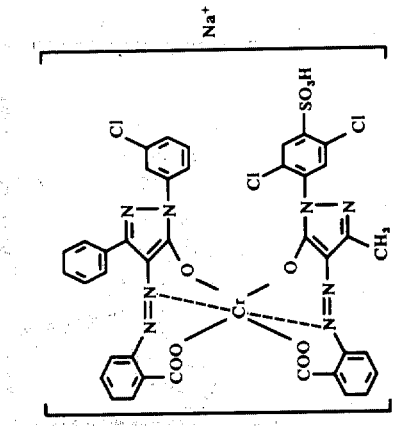
(III)
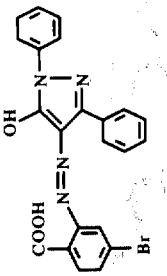
(II)
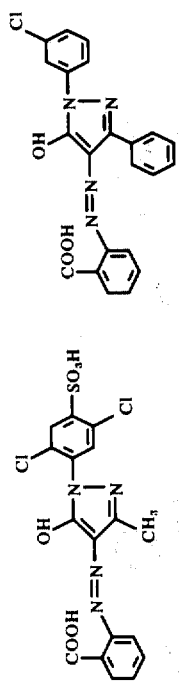
(II)
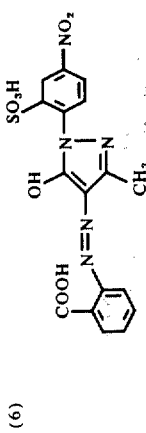
(I)
EXAMPLE NO. (I)  (6)  (7)

-continued
| EXAMPLE NO. (I) | (II) | (III) |
|---|---|---|
| (8) 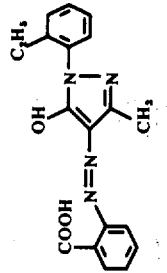 | 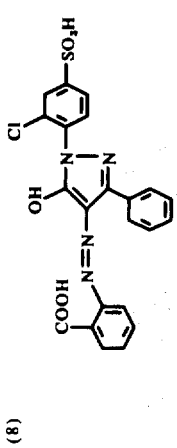 | 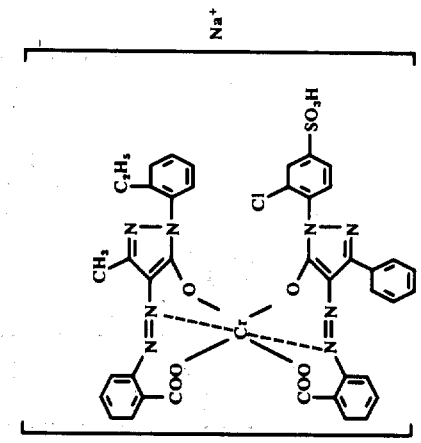 |
| (9) 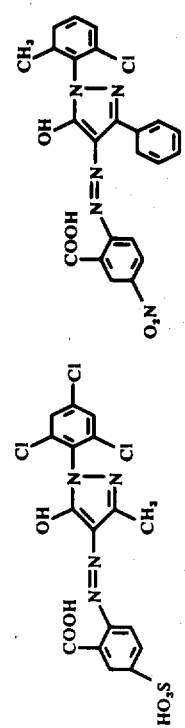 | 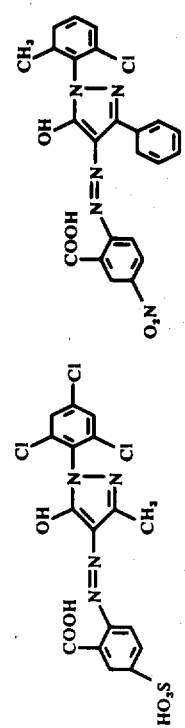 | 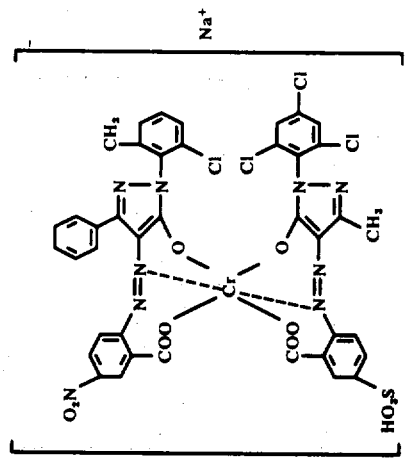 |

-continued
| EXAMPLE NO. | (I) | (II) | (III) |
|---|---|---|---|
| (10) | 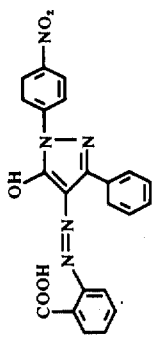 | 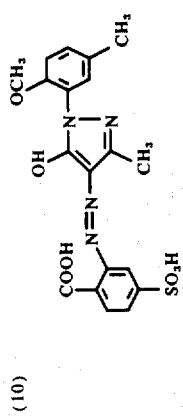 | 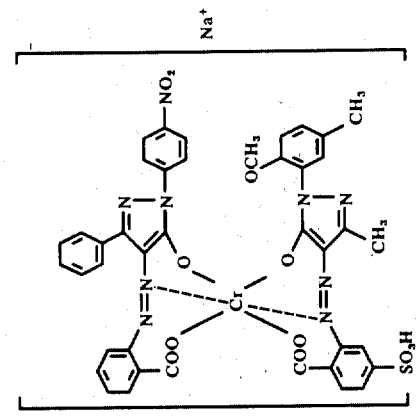 |
| (11) | 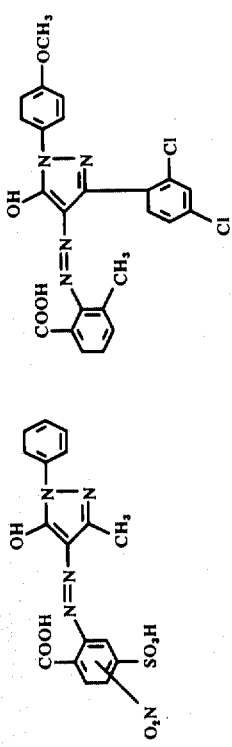 | | 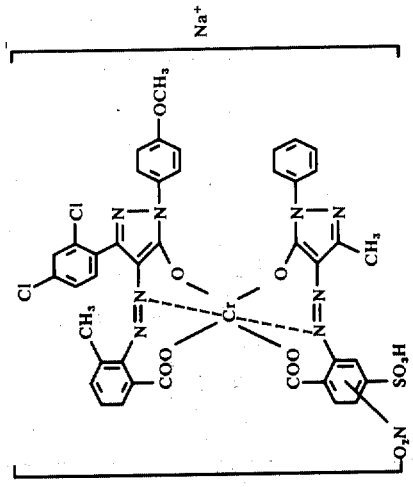 |

-continued
| EXAMPLE NO. | (I) | (II) | (III) |
|---|---|---|---|
| (12) | 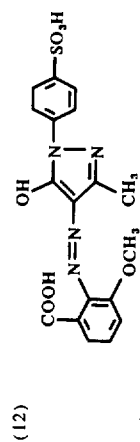 | 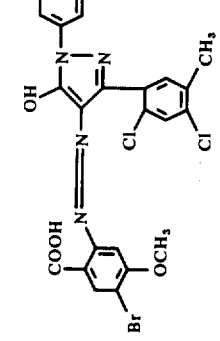 | 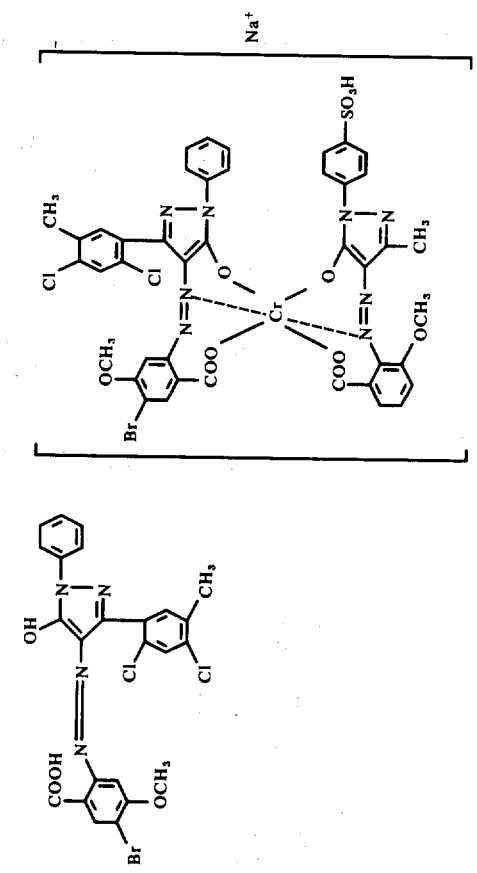 |
| (13) | 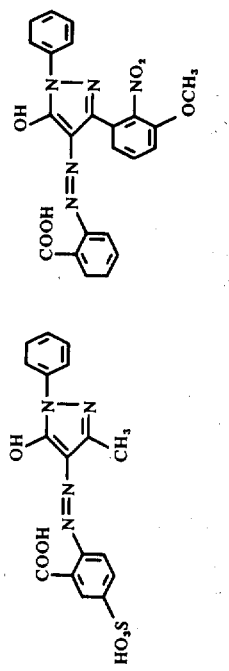 | | 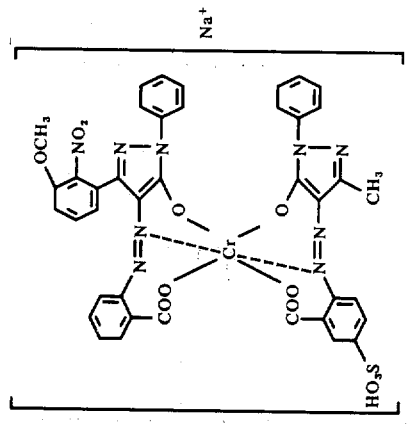 |

-continued
| EXAMPLE NO. | (I) | (II) | (III) |
|---|---|---|---|
| (14) | 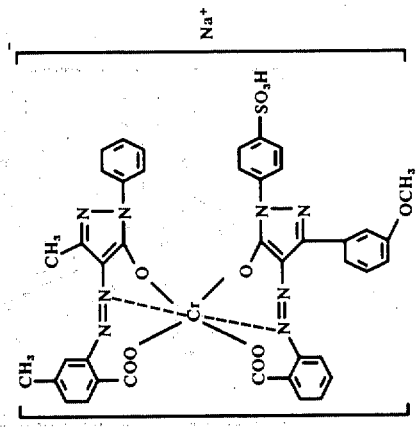 | 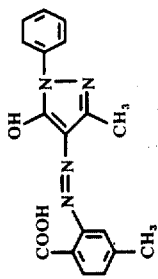 | |
| | | 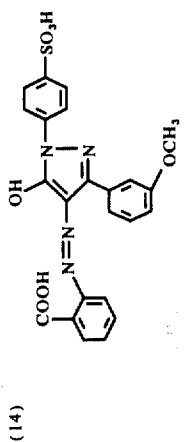 | |
| (15) | 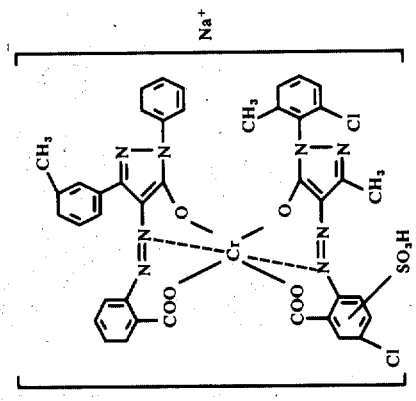 | | 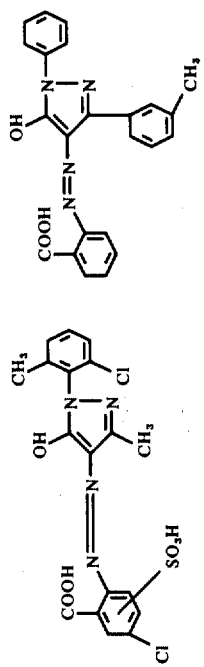 |

-continued
| EXAMPLE NO. | (I) | (II) | (III) |
|---|---|---|---|
| (16) | 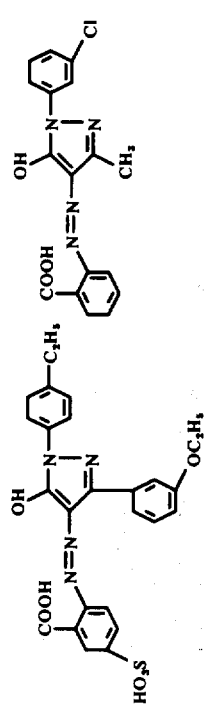 | | 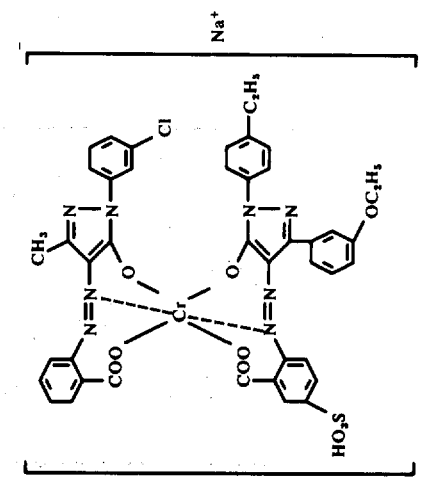 |
| (17) | 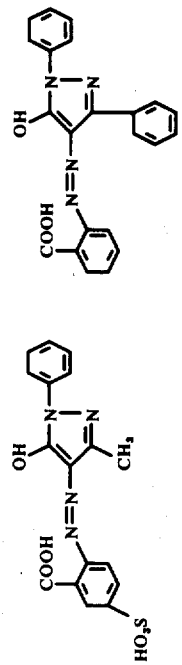 | | 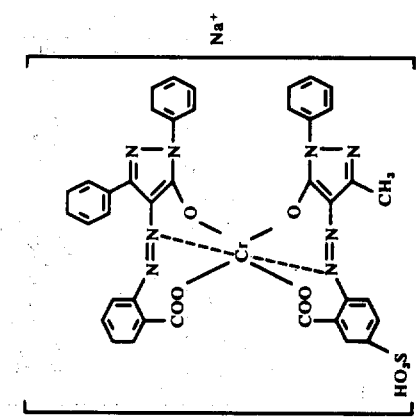 |

-continued
| EXAMPLE NO. | (I) | (II) | (III) |
|---|---|---|---|
| (18) | 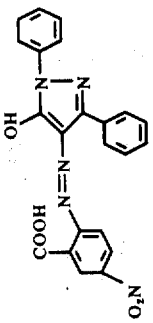 | 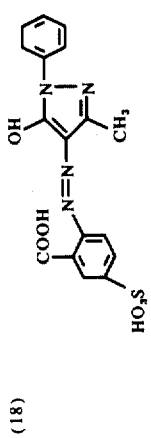 | 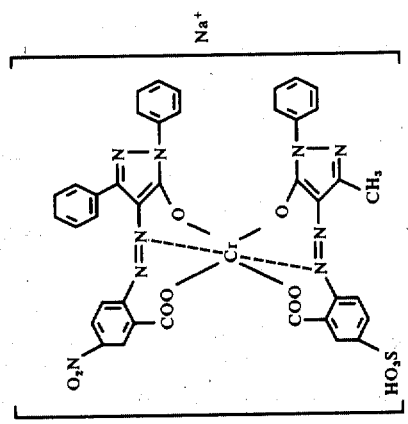 |
| (19) | 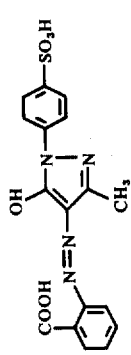 | | 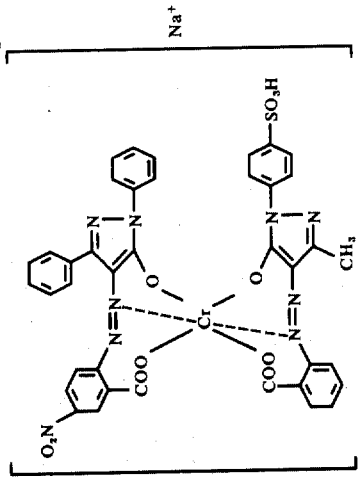 |

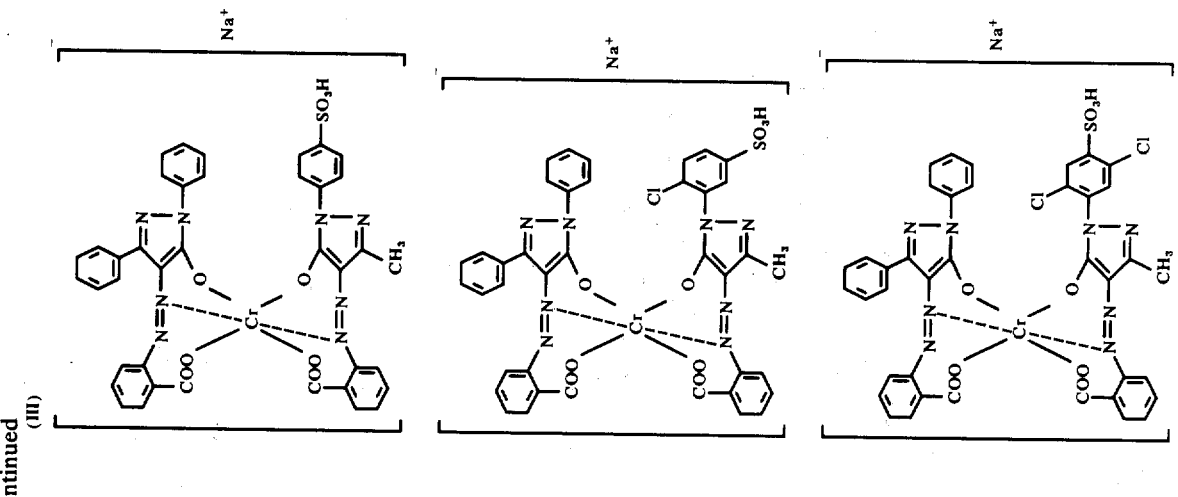
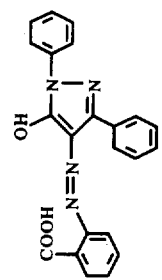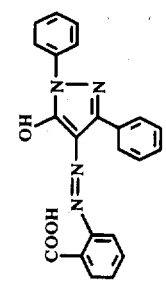
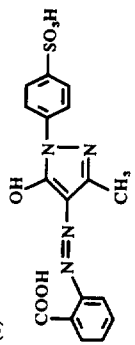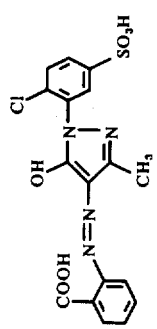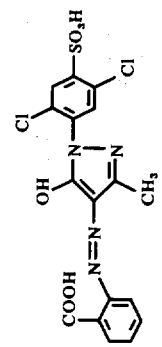
EXAMPLE NO. (20) (21) (22)

-continued
| EXAMPLE NO. | (I) | (II) | (III) |
|---|---|---|---|
| (23) | 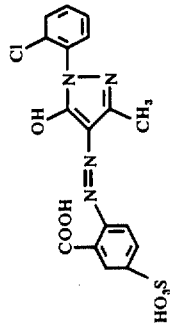 | 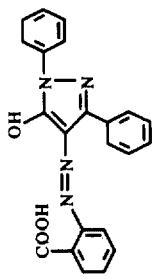 | 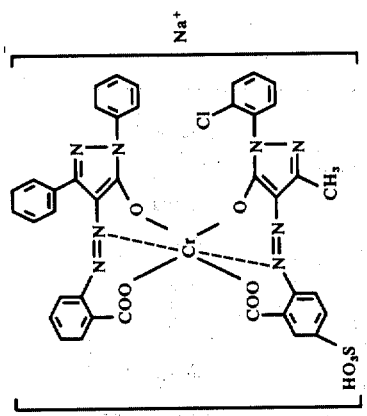 |
| (24) | 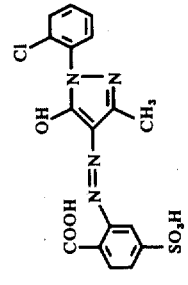 | 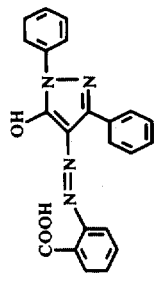 | 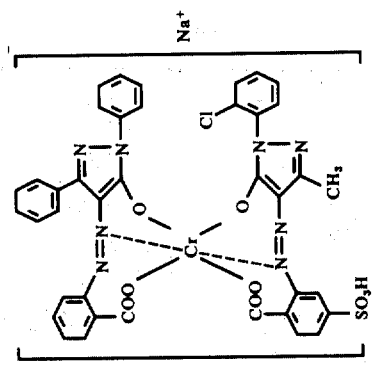 |

-continued
| EXAMPLE NO. | (I) | (II) | (III) |
|---|---|---|---|
| (25) | 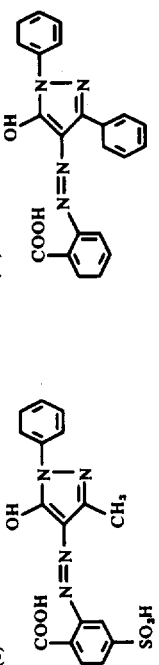 | 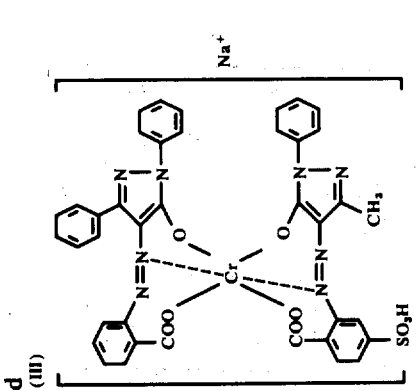 | |
| (26) | 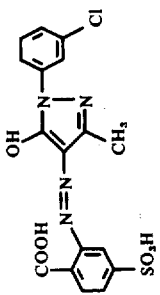 | 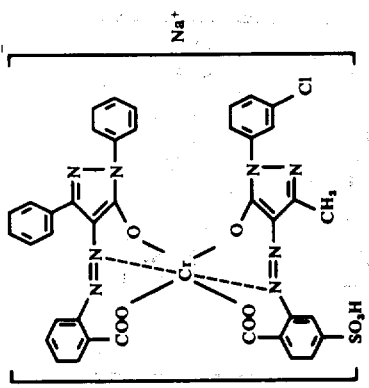 | |

EXAMPLE 27

In 150 parts of water was dissolved 0.03 part of a dye represented by the formula (4). To this solution were added 0.15 part of anhydrous Glauber's salt, 0.15 part of an ammonium salt such as ammonium acetate and then 3 parts of wool. The temperature of the solution was elevated from room temperature to 100° C. in 20–60 minutes and dyeing was effected at that temperature for 30–60 minutes. If necessary, acetic acid might be added to the dye bath to promote adsorption of the dye. Bright yellow dyeings having good fastness to light and washing were thus obtained.

EXAMPLE 28

In 100 parts of water were dissolved 2 parts of a dye of the formula (4) and 5 parts of urea. Nylon taffeta was padded with this solution and subjected to preliminary drying followed by dry-heating for 3 seconds at 180° C. The nylon taffeta was then treated at 100° C. for 20 seconds with an aqueous solution containing 0.6 part of formic acid, washed with water and dried to obtain bright yellow dyeings having good fastness to light and washing.

EXAMPLE 29

In 100 parts of water were dissolved 2 parts of a dye represented by the formula (4) and 5 parts of urea. Nylon taffeta was padded with this solution and subjected to preliminary drying followed by steaming at 120° C. for 2 minutes and washing with water. The nylon taffeta was then treated at 100° C. for 20 seconds with an aqueous solution containing 0.6 parts of formic acid, washed with water and dried to obtain yellow dyeings having good fastness to light and washing.

EXAMPLE 30

In 150 parts of water was dissolved 0.06 part of a dye obtained in Example 18. To this solution were added 0.15 part of anhydrous Glauber's salt, 0.15 part of an ammonium salt such as ammonium acetate and then 3 parts of silk. The temperature of the solution was elevated from room temperature to 100° C. in 20–60 minutes and dyeing was effected at that temperature for 40–60 minutes to obtain bright yellow dyeings having good fastness to light and washing.

EXAMPLE 31

In 150 parts of water was dissolved 0.06 part of a dye obtained in Example 18. To this solution were added 0.6 part of anhydrous Glauber's salt or sodium chloride and then 3 parts of vinylon. The temperature of the solution was elevated from room temperature to 90° C. in 30–60 minutes and dyeing was effected at that temperature for 40–60 minutes to obtain bright yellow dyeings having good fastness to light and washing.

EXAMPLE 32

In 31 parts of water were dissolved 3 parts of a dye obtained in Example 18 and 5 parts of a dye solubilizing agent. To this solution were added 60 parts of a pasting agent (10% paste) and then 1 part of ammonium sulfate to form a coloring paste. Wool was printed with the coloring paste, steamed for 20–40 minutes at 100°–105° C. under normal pressure to fix the dye and then washed with water to obtain bright yellow dyeings having good fastness to sunlight and washing.

What is claimed is:

1. A chromium containing azo dye of the general formula:

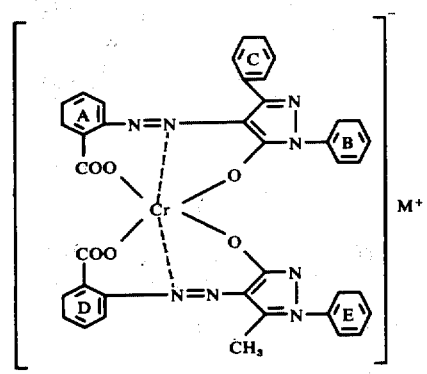

wherein one of the phenyl nuclei A, B, D and E is substituted by sulfonic acid group, the nuclei A, B, C, D and E may be substituted by one or more substituents selected from the group consisting of chlorine atom, bromine atom, nitro group, lower alkoxy group and lower alkyl group and M is an alkali metal.

2. A chromium containing azo dye in accordance with claim 1 of the formula:

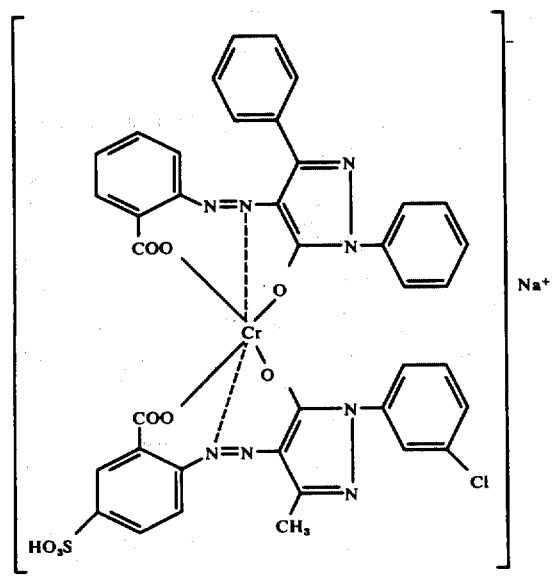

3. A chromium containing azo dye in accordance with claim 1 of the formula:

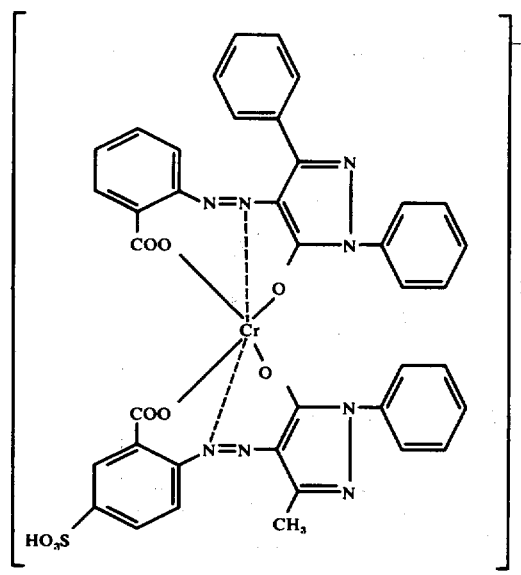
4. A chromium containing azo dye in accordance with claim 1 of the formula:
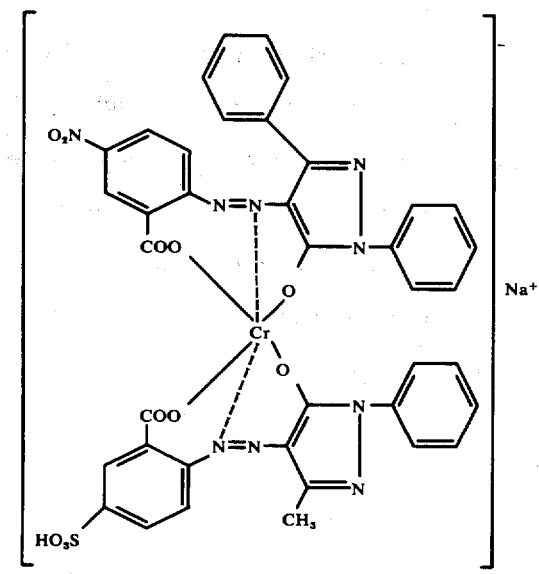
5. A chromium containing azo dye in accordance with claim 1 of the formula:
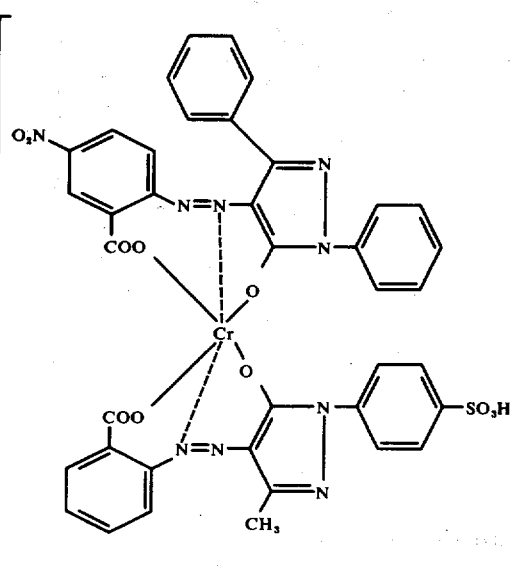
6. A chromium containing azo dye in accordance with claim 1 of the formula:
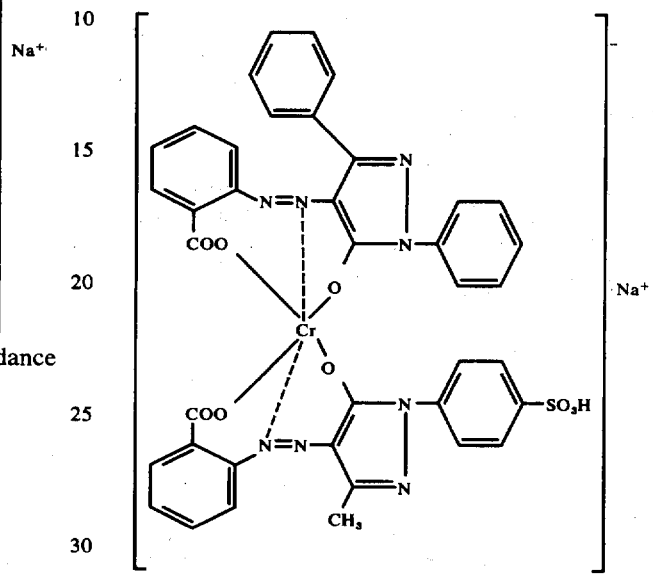
7. A chromium containing azo dye in accordance with claim 1 of the formula:
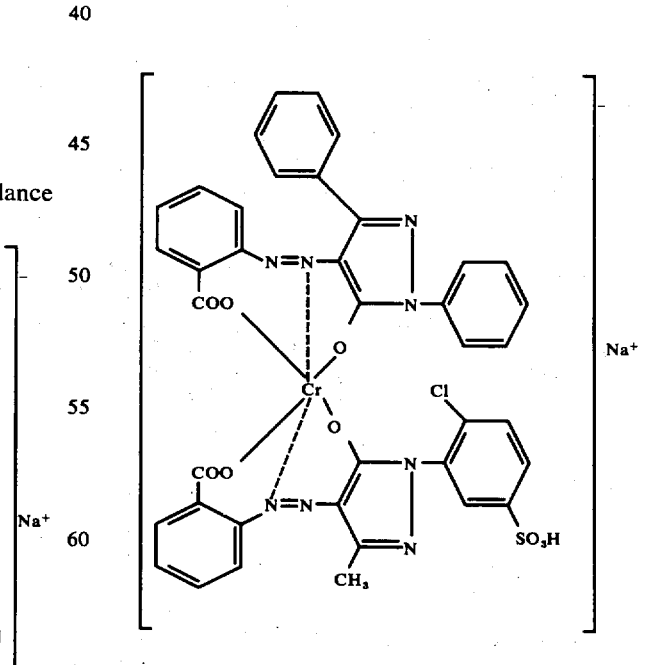
8. A chromium containing azo dye in accordance with claim 1 of the formula:

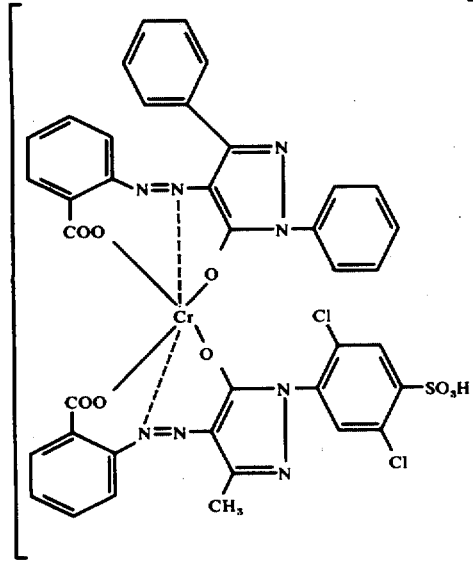
9. A chromium containing azo dye in accordance with claim 1 of the formula:
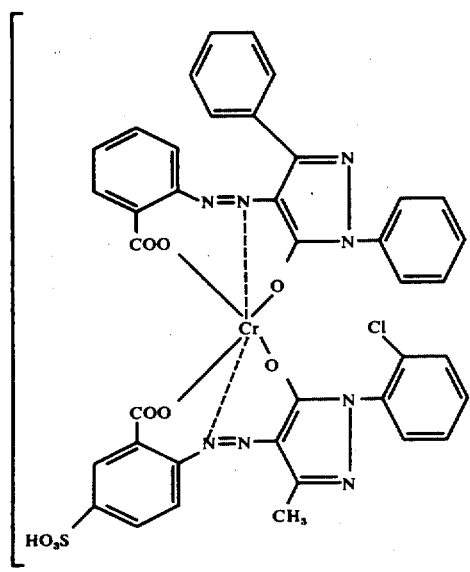
10. A chromium containing azo dye in accordance with claim 1 of the formula:
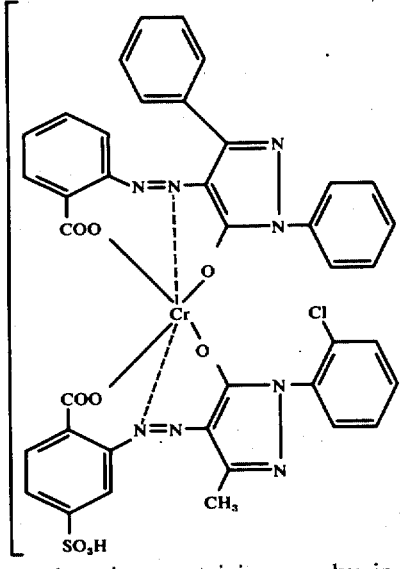
11. A chromium containing azo dye in accordance with claim 1 of the formula:
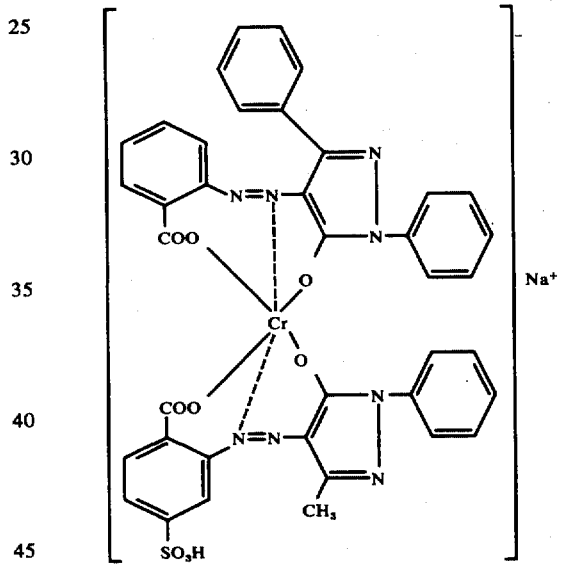
12. A chromium containing azo dye in accordance with claim 1 of the formula:
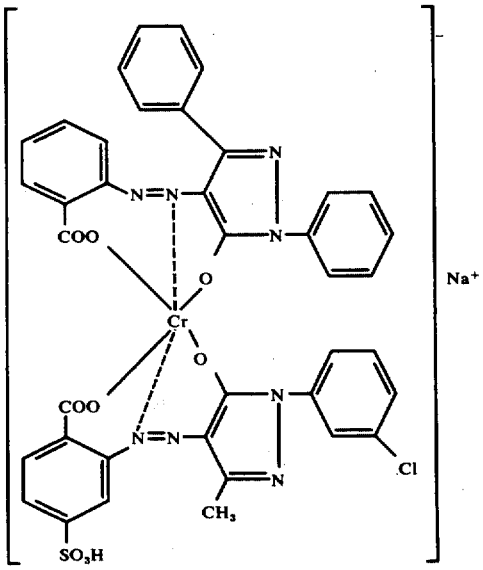
* * * * *